(12) United States Patent
Feller

(10) Patent No.: US 6,431,011 B1
(45) Date of Patent: Aug. 13, 2002

(54) MAGNETIC FLOW SENSOR AND METHOD

(76) Inventor: Murray F. Feller, 21577 NW 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 09/820,057

(22) Filed: Mar. 28, 2001

Related U.S. Application Data

(63) Continuation-in-part of application No. 09/704,913, filed on Nov. 2, 2000.

(51) Int. Cl.[7] .................................................. G01F 1/58
(52) U.S. Cl. ...................................................... 73/861.12
(58) Field of Search .......................... 73/861.13, 861.11, 73/861.12–861.15, 155

(56) References Cited

U.S. PATENT DOCUMENTS 5,297,425 A * 3/1994 Hambry et al. ............... 73/155
6,085,599 A * 7/2000 Feller ....................... 73/861.13

* cited by examiner

Primary Examiner—Benjamin R. Fuller
Assistant Examiner—Jewel V. Thompson
(74) Attorney, Agent, or Firm—David Kiewit

(57) ABSTRACT

A magnetic flow sensor is configured to compensate for electrode related drifts by connecting the electrodes either to each other or to a reference voltage during most of an operating duty cycle. Some versions of the invention use multiple sensing heads in a single sensor to increase the magnitude of the flow related signal, either by interconnecting ones of the electrodes or by externally summing the signals. Additionally, some versions of the sensor can be used with weakly electrically conducting flow conduits, such as blood vessels.

31 Claims, 8 Drawing Sheets

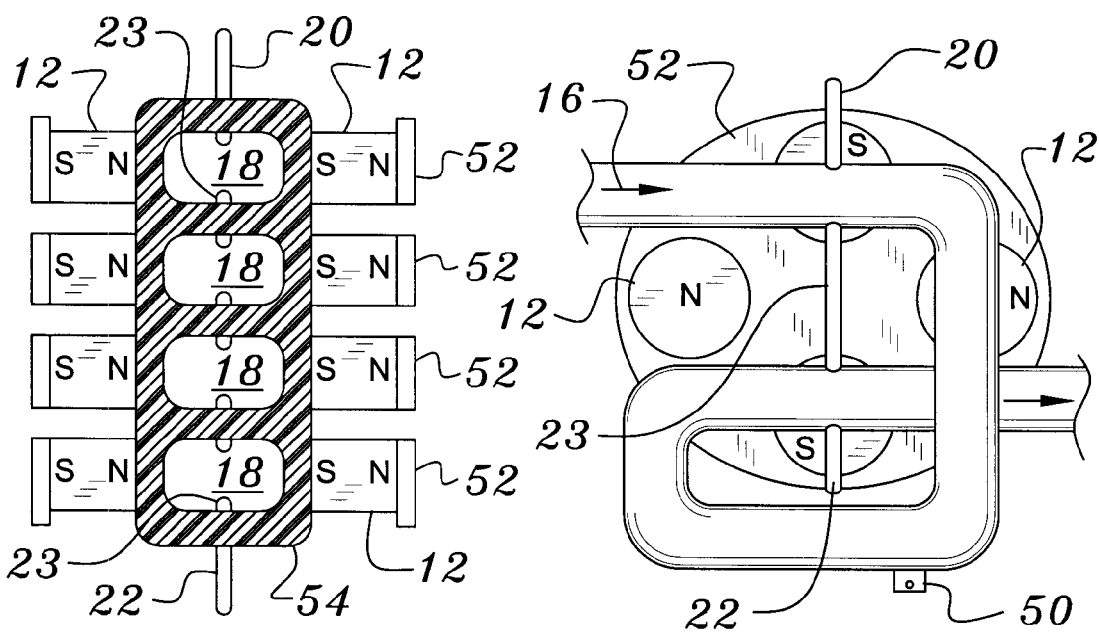
FIG. 14
FIG. 16
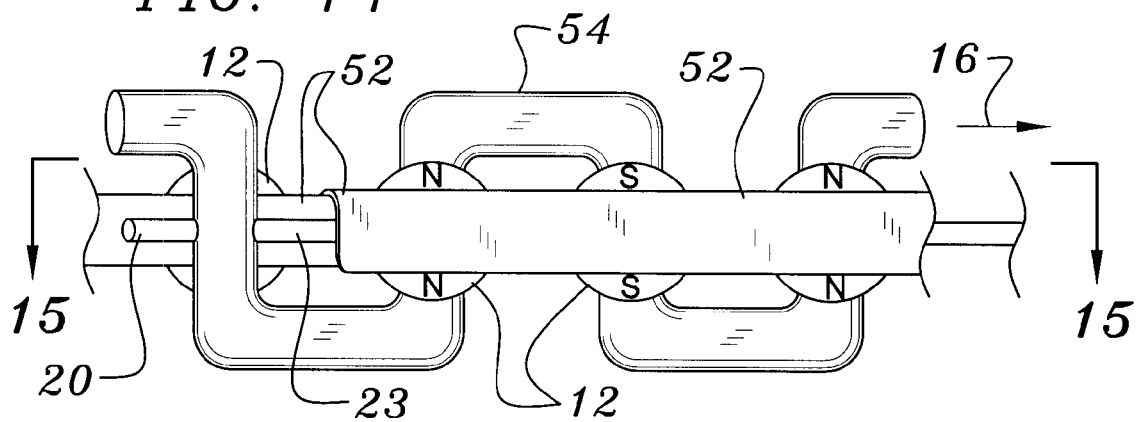
FIG. 12
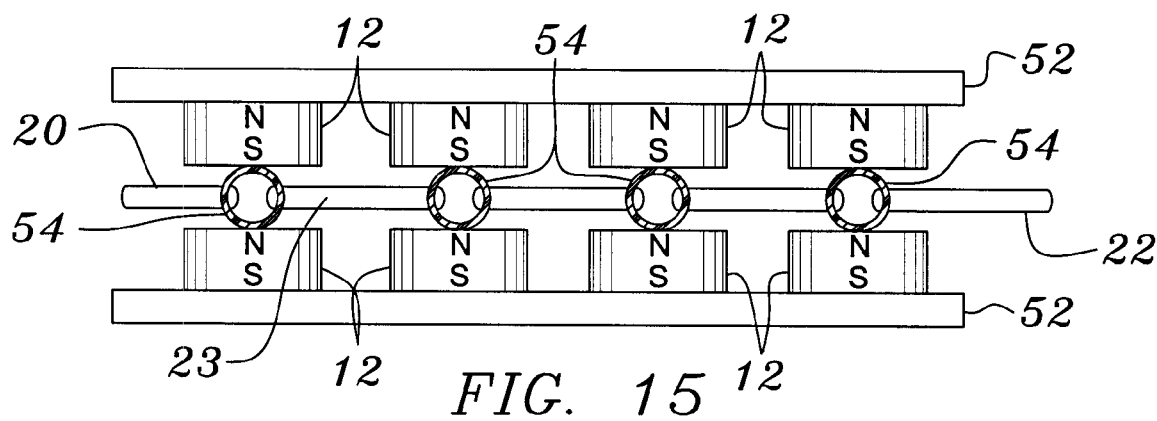
FIG. 15

MAGNETIC FLOW SENSOR AND METHOD

CROSS REFERENCE TO RELATED APPLICATIONS

This application is a continuation in part of U.S. application Ser. No. 09/704,913, filed on Nov. 2, 2000

BACKGROUND OF THE INVENTION

1. Field of the Invention

This invention relates to apparatus and method for determining the rate of flow of a fluid by measuring an electrical potential difference developed in the fluid as the fluid moves through a magnetic field.

2. Background Information

In a magnetic flow meter an electrical potential difference developed in the fluid is sensed by at least one pair of electrodes contacting the liquid and spaced apart from each other along a line that is generally orthogonal to both the direction in which the flow is being measured and a magnetic field produced by a magnet. The measured potential difference has a magnitude proportional to the flow rate of the fluid. As is known to those skilled in the art, the overall potential difference between two such electrodes, usually termed a voltage difference, has two major components: a) a flow-related voltage due to the flow of the fluid when acted upon by the magnetic field; and b) a net 'drift voltage', which is the sum of voltages due to all other factors, such as electrode polarization.

In prior art flow sensors of this type, alternating magnetic fields from electromagnets have generally been used to provide an alternating magnetic field. The alternating magnetic field facilitates signal amplification and processing that accepts flow-related electrode signals while rejecting electrode drift signals which would otherwise introduce serious measurement errors. However, generating those fields and processing the measured voltage signals requires sophisticated circuits and techniques which raise the cost of such sensors and limit their application.

An example of a radical departure from the prior art is found in my U.S. Pat. No. 6,085,599 in which I teach mechanical means to alternate the polarity of the magnetic fields. Those techniques provide practical ways of simplifying magnetic flow sensors and reducing their costs. However, the use of mechanical means to alternate the field polarity, even though this may be performed with a high degree of ruggedness and reliability, reduces the marketability of such an instrument The disclosure of U.S. Pat. No. 6,085,599 is incorporated herein by reference.

Another problem encountered in prior art magnetic flow sensors is that of entrapment of ferromagnetic debris. This is particularly true of arrangements using permanent magnets as in my U.S. Pat. No. 6,085,599. Such debris can change the magnetic flux distribution and thereby alter the calibration of the flow meter. Moreover, pieces of ferromagnetic debris can sometimes bridge the electrodes, which are normally electrically insulated from each other, producing a conductive path that may partially short out the electrode signals and thereby reduce the output voltage. Fine particles of debris can also form a film on normally insulating portions of the structure surrounding the electrodes and thereby shunt the electrode signals.

It is therefore an object of the invention to provide a practical magnetic flow sensor using stationary permanent magnets.

It has also been discovered that the methods of the present invention can be used with conventional magnetic flow sensors using electromagnets to improve their performance and such is therefore a further objective of the invention.

BRIEF SUMMARY OF THE INVENTION

The above and other objects are attained by magnetic flow sensors in accordance with various preferred embodiments of the present invention. In preferred embodiments the magnetic axis (i.e., the line extending from the south to the north pole) of a permanent magnet is oriented generally perpendicular to a direction of flow of a fluid. As is known in the magnetic flow metering art, the flux from a magnet arranged in this fashion generates, in the fluid, a voltage difference proportional to the flow rate of the fluid. In various embodiments of the invention this voltage difference is sensed by the use of a sensing head comprising a pair of electrodes (which preferably have the same size and shape and are made of the same material) which are spaced apart from each other along a line that is generally orthogonal to both a direction of flow and the magnetic axis.

The voltage indicative of flow rate is measured when the two electrodes of a pair are in an open-circuit state in which they are externally electrically connected to a high impedance voltage measurement circuit. In this open circuit state the electrode potentials are electrically influenced by electrode polarization and other measurement error-inducing factors that develop relatively slowly. In order to minimize measurement errors with these factors, sensors of some embodiments of the invention provide an operating cycle in which the two electrodes of a pair thereof are in a closed circuit state for most of the time, and are placed in an open circuit state only during a brief measurement interval portion of the operating cycle. When in the closed circuit state the electrodes may be short circuited to each other, connected to respective reference voltage sources (typically zero to a few tens of microvolts) or connected to a common potential such as ground. A major purpose of the closed circuit state, reducing drifts, is served by connecting the two electrodes together. Connection to other selected potentials, including ground, can provide compensation for minor drifts. The reference voltage sources include voltage levels which may be different for each electrode and which may even vary with the output flow rate signal from the flow sensor. In the closed circuit state, particularly during installation and set-up, the electrodes may be connected to alternating potentials having magnitudes as high as several volts and frequencies of several kilohertz in order to drive the electrodes quickly into a steady state condition. Periodically, each electrode pair may be switched from its closed circuit to its open circuit state for a brief time interval so that the flow-generated voltage difference then appearing at the electrodes may be detected and processed to provide an output signal representative of the flow rate of the fluid. During the open circuit portion of this duty cycle, drift inducing factors begin to cause drift signals to develop. However, they develop relatively slowly compared to the brief time interval required to detect the flow rate signal and thereby enable electronic processing to discriminate between the two. This method of flow rate detection thereby enables an extremely simple magnetic flow sensor to be made. In other cases, in which the flow rate signal is found to change slowly with respect to drift signals, the closed circuit state may comprise a smaller portion of the operating duty cycle and the open circuit state a correspondingly large portion of the duty cycle so as to allow the full magnitude of the flow rate signals to be detected.

As will be disclosed in greater detail hereinafter, the flow rate of a fluid can be sensed by arrays of sensing heads comprising two or more pairs of electrodes and at least one magnet having its magnetic axis oriented perpendicular to a direction of flow. Each of the sensing heads in an array, as recited above, comprises a pair of electrodes spaced apart from each other along a line generally orthogonal to both the direction of flow at that sensing head and to the magnetic flux. The sensing heads in an array thereof are spaced apart from each other along the flow path of the fluid. For example, two sensing heads can be spaced out along a section of pipe or tubing. The flow rate voltages from the plurality of heads can be polarized to be additive in the associated signal processing circuitry, which may be adapted to measure all the heads simultaneously, or which may measure the voltages one at a time in a sequential, scanning, fashion. Furthermore, because more than one pair of electrodes may be used with a single or with cooperative magnetic fields, the sensor can be configured as comprising paired arrays of electrodes that can be momentarily externally connected in differing combinations so as to provide a statistical sampling base from which the output signal is derived. For example, if two arrays of four electrodes each are paired, sixteen different combinations of individual electrode pairs can be sampled. Because DC drift voltages at the various electrodes would have a random distribution of magnitudes and of polarities, the drift voltages thus tend to average out to zero when the overall electrode voltages are summed or sampled and averaged. The magnitude of the flow related signal can thus be made relatively high compared to the error related drifts, thereby improving sensor performance. Series connection of the electrodes between more than one sensing head is also applicable and similarly advantageous and enables the direct addition of the flow related signals to be obtained. The present invention is well adapted to such configurations because of the low cost of the components that are used.

In addition to improving the ratio of flow-related signals to drift signals, a two-headed sensing configuration comprising an upstream head and a downstream head can be used to detect the presence of ferromagnetic debris, most of which is likely to be trapped by the permanent magnet portion of the upstream sensing head. This debris can alter the magnetic flux distribution and shunt the flow-related voltage of the upstream head, thereby reducing the magnitude of its flow-related voltage. Thus, if one compares the flow-related signals from identical upstream and downstream sensing heads and finds that those signals differ by more than some predetermined threshold value, one can conclude that at least the upstream head is contaminated with ferromagnetic debris and that cleaning of the wetted portions of the sensor is required.

Although various numbers of sensing heads can be used in the invention, in preferred methods of operation the paired electrodes of each sensing head are in the closed circuit state during a relatively long portion of an operating duty cycle. During a relatively short portion of the duty cycle a switching device can be used to sequentially open circuit pairs of electrodes and connect each open circuited pair to a common measurement circuit in order to measure its flow-related open circuit voltage. A switching device can also open circuit pairs of the electrodes and connect them to separate inputs of a common measurement circuit to measure the flow related voltages. Those skilled in the signal processing arts will realize that with these and other arrangements for aggregating open circuit voltages one can obtain a simple average of the output voltages, an average of the sum of the individual output voltages, or various other selected statistical measures.

Generally speaking, the flow-generated component of the open circuit voltage will appear quickly (i.e., it can be measured after a predictable rise time that depends primarily on the resistivity and dielectric constant of the flowing fluid) after an electrode pair is switched from a closed circuit state to an open circuit state. Electrode pair drift voltages, by contrast, depend on electrode polarization and other generally much more slowly acting effects and can thus generally be effectively excluded by making the open circuit voltage measurement quickly. Thus, one can readily determine a fluid-dependent operating duty cycle comprising a first period in which all electrode pairs are connected together in a closed circuit state for a long enough interval for polarization and other drift effects to reach an acceptably stable condition; and a second readout period in which appropriate switching devices and voltage measurement circuitry are used to detect the open circuit voltages from all the electrode pairs used in the sensor. In a preferred embodiment the first period is substantially longer then the second. Other relationships between the lengths of the first and second periods are also workable.

In some embodiments multiple permanent magnets are used with an internal streamlined body and a flow tube, both of which are electrically insulating and in contact with the fluid. Each such section has its own pair of electrodes. Both the magnetic flux, which is orthogonal to the fluid flow, and the fluid itself are thus concentrated to provide a relatively large flow-related signal.

In another preferred embodiment of the present invention, the flux from two permanent magnets reinforce each other across an orthogonally oriented passage through which a fluid flows. Various other preferred embodiments including probe configured flow sensors are included.

In some embodiments, the present invention is applied to conventional magnetic flow sensors which use a pulse of electrical energy through a coil of wire to produce a pulsed magnetic field. After the pulsed magnetic field stabilizes, the electrodes are placed in the open circuit state so that the flow generated voltage difference can be detected and processed to provide a flow signal representative of the flow rate of the fluid. Operation is therefore essentially the same as when the permanent magnet is used.

Those skilled in the arts of magnetic flow sensing will appreciate that although relative motion between a liquid and a sensing head is essential in instruments of this sort, there is no requirement that the sensing head be stationary in an inertial frame of reference. One can equally well use the invention for measuring the rate of progress of a sensing head through a stationary fluid, as is done when measuring the speed of a ship having a sensing head mounted to or projecting outwardly from its hull. Moreover, one can configure a sensor having two pairs of mutually orthogonally disposed electrodes (e.g. as depicted in FIG. 1) in which each of the pairs is responsive to a component of fluid flow orthogonal to the line along which that pair is spaced. A sensor of this sort can be used to determine the direction of flow, as well as for measuring the magnitude of the flow rate.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

FIG. 8a is a schematic side view of a sensing head configured as a flow probe.

FIG. 10b is a schematic cross-sectional view of a sensor using an array of two of the sensors heads of FIG. 10a.

FIG. 12 is a partly cut away elevational view of a sensing head arrangement which alternates both the direction of the fluid flow past the heads and the magnetic polarity in order to enable the flow generated signals from all of the heads to be summed.

FIG. 13 is a schematic cross-sectional view of the head of FIG. 10a, the section taken as indicated with the double-headed arrow 13—13 in FIG. 10a.

FIG. 14 is a sectional view of the head of FIG. 11, the section taken as indicated with the double-headed arrow 14—14 in FIG. 11.

FIG. 15 is a sectional view of the head of FIG. 12, the section taken as indicated with the double-headed arrow 15—15 in FIG. 12.

FIG. 16 is a partial elevational view of a sensing arrangement using a flow loop in which fluid sequentially flows by each of a plurality of heads, wherein all the heads have a common magnetic orientation, and wherein a magnetic subassembly comprising four permanent magnets and a ferromagnetic disk has been removed to show the flow loop, electrodes, and second magnetic subassembly.

DETAILED DESCRIPTION OF THE INVENTION

Figure 1:
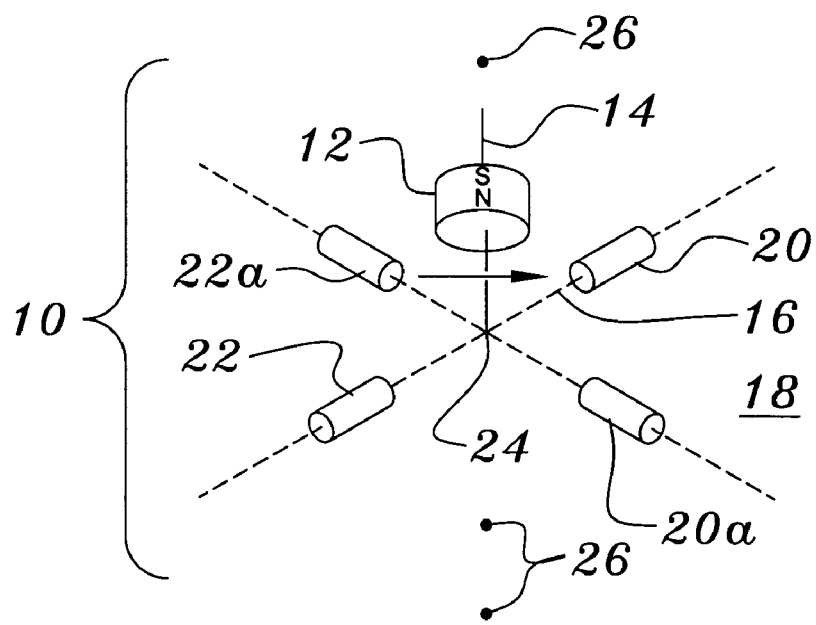
FIG. 1 is a schematic view of the sensing head portion, i.e., the signal generating components, of a flow sensor of the invention.

FIG. 1 schematically illustrates the basic signal generating components, or sensing head 10, used in a variety of flow sensors of the present invention. A magnet 12, which is preferably a permanent magnet but which may be an electromagnet, is aligned so that its magnetic axis 14 provides magnetic flux generally orthogonal to a plane in which fluid 18 is flowing along a direction of flow 16. When the direction of flow is known, a pair of electrodes 20, 22 are spaced apart along a line 24 that is generally orthogonal to both the magnetic axis 14 and to the direction of flow 16 to sense the flow-responsive signal generated in the fluid 18. When the direction of flow is not known and a component of the flow rate along a selected direction is to be measured, the electrodes are spaced apart along a line orthogonal to both the magnetic axis and to the selected direction. Those skilled in the art of magnetic flow meters, or Faraday flow meters, will understand that although an ideal measuring arrangement of this sort is discussed in terms of mutually orthogonal axes, deviations from perpendicularity may occur in practice and result in corresponding degradation of performance that is explicable by the well known cosine relationships that are used to deal with circumstances in which the direction of fluid flow is not exactly perpendicular to the line along which the electrodes are spaced apart. Hence, the term "orthogonal", as used hereinafter denotes generally orthogonal relationships as ideal, but encompasses deviations from that ideal arrangement.

As depicted in FIG. 1, one may provide a second pair of electrodes 20a, 22a spaced apart along a line orthogonal to both the magnetic axis and to the line along which the first pair 20, 22 of electrodes is spaced apart. In a sensor of this sort, each pair of electrodes generates a signal proportional to the cosine of the angle between the line along which the two electrodes of the respective pair are spaced apart and the direction of flow 16. In other words, each pair of electrodes is responsive to a component of fluid flow orthogonal to the line along which the two electrodes of the pair thereof are spaced apart. In cases in which the direction of flow is not known a priori, or in which that direction can vary, a sensor comprising two mutually orthogonal pairs of electrodes can be used to determine both the magnitude and direction of flow.

A preferred sensing head 10 comprises at least one permanent magnet 12 and at least one pair of electrodes 20, 22 arranged as described above. As will be described in greater detail hereinafter, additional magnets 12 or electrode pairs 20, 22 may be used in some sensing heads 10. These additional components are schematically indicated in FIG. 1 by black dots 26.

Figure 2:
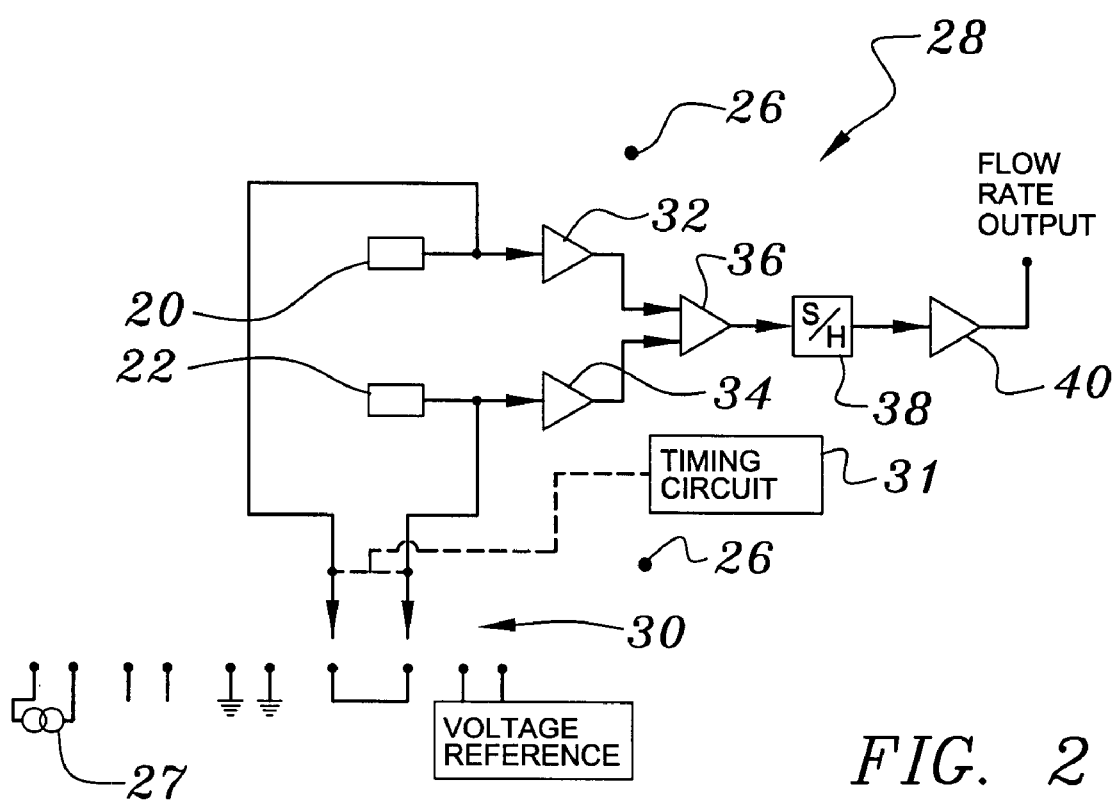
FIG. 2 is a schematic block diagram of an electronics circuit usable to control and process signals generated by a sensing head of the invention.

Turning now to FIG. 2, one finds a simplified block diagram of preferred electronic circuitry used with the preferred sensing head 10. A switching device 30, which is preferably a CMOS switch, but which may be an electro-mechanical relay or other suitable switching element, is arranged so that it either places the two electrodes 20, 22 of a pair in the closed circuit state; or it places them in the open circuit state in which they are connected to circuitry adapted to measure the open circuit voltage difference between them. In a preferred embodiment, the switching device 30 operates under control of an appropriate timing circuit 31 to provide an operating duty cycle comprising a relatively long period during which the electrodes 20, 22 are in a closed circuit state and a relative short interval during which the voltage measurement is made. The voltage measurement circuit 28 can comprise a plurality of amplifiers 32, 34, and 36 that can amplify and detect the difference voltage between the electrodes, and store the measured voltage in a sample and hold circuit 38 for final amplification by an output amplifier 40. Such an amplifier chain would typically incorporate high pass filtering to pass the short duration voltage pulse present during the measurement interval while the relay 30 is open, while rejecting any slow changing voltage typical of electrode drifts. The preferred amplifier chain incorporates capacitive coupling to the sample and hold 38 so that its own DC voltage drift will be eliminated from the stored signal. The output amplifier 40 would typically have a low pass filter to attenuate noise and ripple resulting from the sampling operation of the sample and hold 38. The amplifier chain 32, 34, 36 is also ground referenced to the sensing components 10 so that they operate within their dynamic range. The ground is preferably a direct connection to the fluid and typically involves an electrode attached to the sensing head, a conductive portion of the sensing head mechanical assembly or connection to electrically conductive pipes or tubing through which the fluid may be flowing. The ground may also be obtained by connecting the average voltage of the electrodes 20, 22 through a high impedance to a ground connection of the electronics 28.

The circuitry may include other refinements as apparent to skilled practitioners in the electronic arts. For example, amplifiers 32,34 and 36 need relatively high speed response to amplify the short pulse of flow rate related signal along with low noise, and this requires relatively high amplifier operating power. This power may be reduced by removing operating power except during their amplification of those pulses. The sample and hold 38, output amplifier 40 and timing circuits typically operate at very low power levels so that the output signal would be maintained.

In one preferred embodiment of the present invention, a switching device 30 periodically connects the electrodes 20, 22 together during a relatively long period after which the connection is broken for a much shorter period during which the difference in their voltages is detected and processed to yield a signal indicative of flow rate. The electrodes 20, 22 could instead have been connected to the electrical ground or some other electrical potential, for example. Should a sustained high rate of fluid 18 flow result in a significant residual electrode 20, 22 voltage difference due to electrode polarization, this polarization may be neutralized by connecting the electrodes during at least a portion of the period that they would have been connected together, to a source of an opposing voltage. One way to provide polarization neutralization which is self regulating is to use a portion of the signal from a voltage divider to ground which is supplied from the output amplifier 40, as the voltage source to which electrode 22 is shorted to while connecting the other electrode to the same voltage magnitude but with opposite polarity as provided by an inverting amplifier. During the closed circuit state, and at other times, the paired electrodes may be connected to an AC signal source 27 in order to aid in attaining stability. The AC source 27 may, for example, have an output of several volts at a frequency of several kilohertz.

The sensing head 10 of FIG. 1 and basic switching and measurement circuitry of FIG. 2 can be viewed as building blocks for various embodiments of the present invention and may be used more than once, as indicated in both figures by the black dots 26. Because the relay 30 opens for only a very short interval compared to the drift rate normally associated with the electrodes 20, 22, the resultant drift voltage will be relatively small. Furthermore, the electrode signals have a consistent flow rate related magnitude and polarity which enables those signals to be summed to increase those magnitudes. However, if the electrodes are of the same substance, have similar surface areas, and are exposed to the same fluid environment, they will experience voltage drifts of a random nature that will tend to average out to zero. The extent of the neutralization provided depends on the materials used for the various electrodes as well as on the electrical properties of the fluid, all of which must be compatible to enable the electrodes to recover from the closed circuit state quickly enough to sense and convey the flow generated signals from the fluid to the input amplifiers 32, 34 while the sample and hold circuit 38 is in its sampling state. Under some operating conditions the flow rate signals may change slowly with respect to the drift signals. In these situations the paired electrodes 20, 22 may be placed in the closed circuit state for a relatively shorter portion of the operating duty cycle in order to allow a larger flow generated voltage to be detected by the sample and hold circuit 38. Moreover, under some operating conditions, it may be advantageous to operate the sample and hold 38 multiple times during a single dosed circuit state portion of an operating duty cycle. In particular, this may be true when combining the outputs from multiple sensing electrode pairs.

In a typical operation the contacts of the relay 30 are closed and connect the electrodes together almost continuously. For example, they cyclically close for ninety nine milliseconds and open for only a one millisecond interval during which the signal processing occurs. With this method of operation, electrical currents between the electrodes will tend to equalize their residual offset voltages to enable instability problems due to electrode polarization and other factors to be sufficiently reduced so that a practical flow sensor can be realized without the need to alternate the polarity of the magnetic flux, thereby enabling a relatively simple and low cost flow sensor to be produced.

Figure 3:
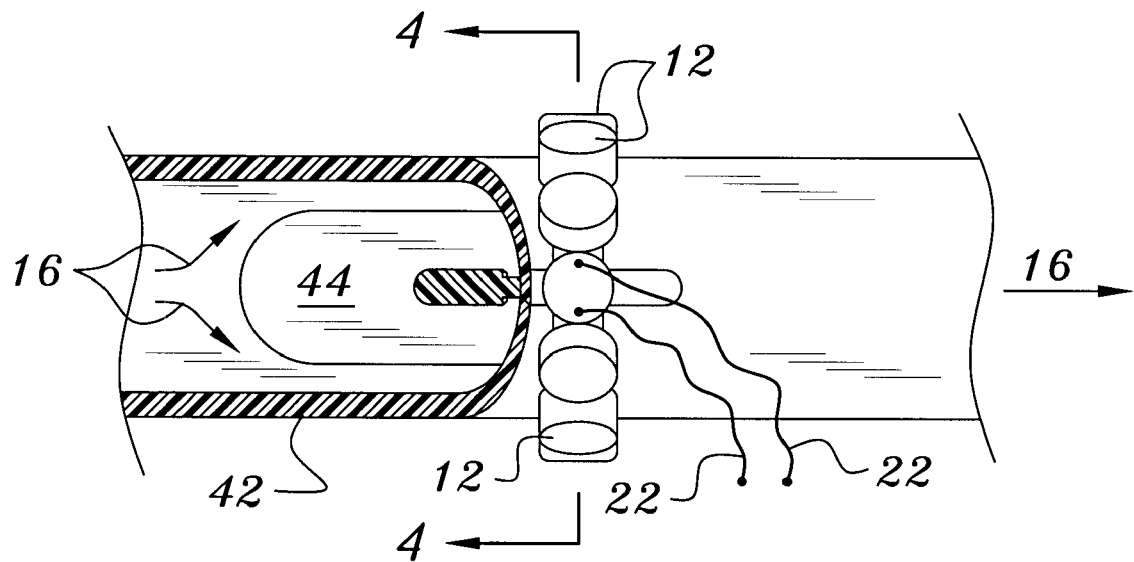
FIG. 3 is a partly cut away side elevational view of a preferred sensing head mounted in a pipe or tube.
Figure 4:
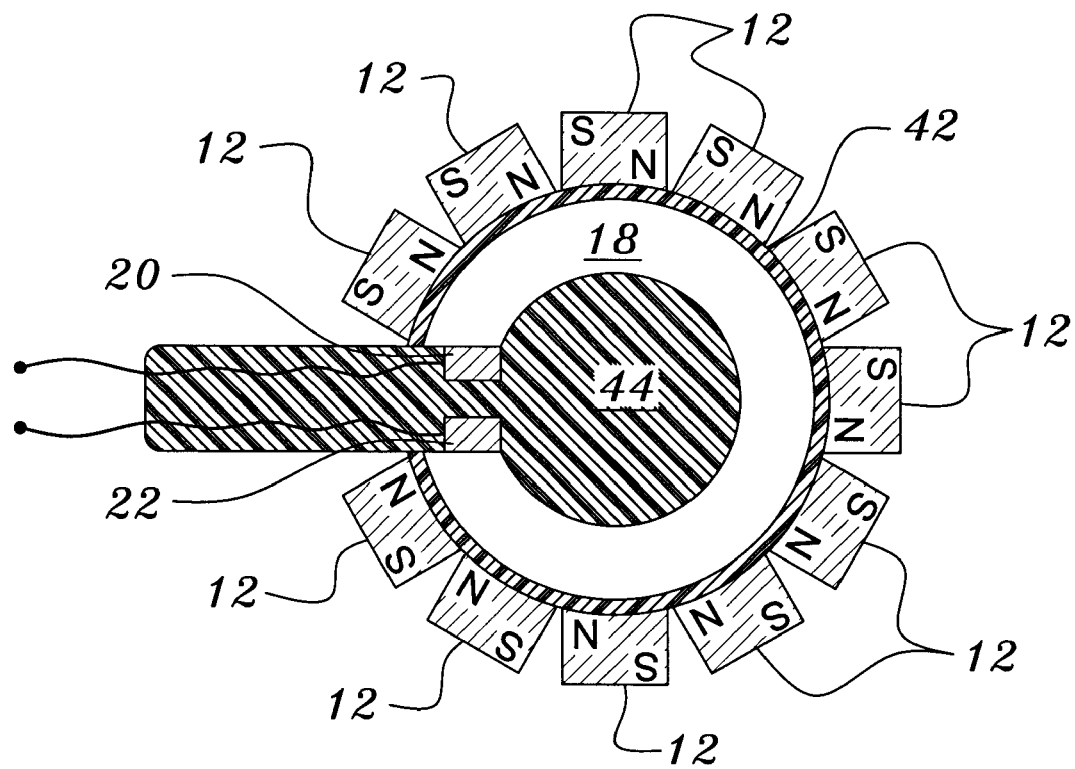
FIG. 4 is a cross sectional view of the sensing head of FIG. 3, the section taken as indicated with the double headed arrow 4—4 in FIG. 3.

FIGS. 3 and 4 depict one embodiment of a sensing head in accordance with the present invention. A tube 42 confines a flowing fluid that passes around a streamlined member 44 elongated in the direction of flow and retained in its position along the axis of the tube by a suitable support that projects through the wall of the tube and that supports the electrode pair. In a preferred depicted embodiment, the streamlined member 44 defines a fluid flow region that, except for the portion intercepted by the support, is annular. Sensing electrodes 20, 22 are preferably located on opposite sides of the support so as to define a nearly annular path over which the flow-related voltage is measured. Magnets 12 provide a generally uniform field of magnetic flux orthogonal to the annulus. This use of multiple permanent magnets having their magnetic axes aligned along radii of the tube, and a streamlined member 44 reduces the cross sectional area of the passages for the flowing fluid 18, increases the voltage generating distance between the electrodes to be nearly equal to an inner circumference of the tube 42, and increases the magnetic flux in those passages, thereby increasing the magnitude of the flow-generated signal.

In FIGS. 3 and 4, a plurality of permanent magnets 12 spaced apart along a circumference of the outside of a tube 42 are used to provide the magnetic field. A single magnet magnetized with a radial orientation of its flux could similarly be used. One or more magnets with other flux orientations which may use magnetic materials to direct and concentrate the flux are also usable. A moving coil loudspeaker, for example, uses a similar radially oriented flux to activate its voice coil. The magnets may additionally or entirely be located in the streamlined member 44. Moreover, the streamlined member 44 may be modified to be a flat plate to provide the equivalent isolation between the electrodes. The relative polarity of the magnetic fields may be changed as long as the flow generated voltages in the fluid do not short circuit each other.

FIGS. 5, 6a, 6b, and 6c depict variations of a preferred embodiment of the flow sensor which is well suited for small pipe sizes. Magnets 12 provide mutually aiding magnetic flux through the fluid which is contained by the electrically insulating housing 54. Electrodes 20, 22 sense the voltage signals generated in the fluid and route them to the supporting electronics. A separate ground electrode 50 provides a ground connection between the fluid and the supporting electronics, and a magnetic trap 48 removes magnetic debris from the inlet to the sensing head.

Figure 5:
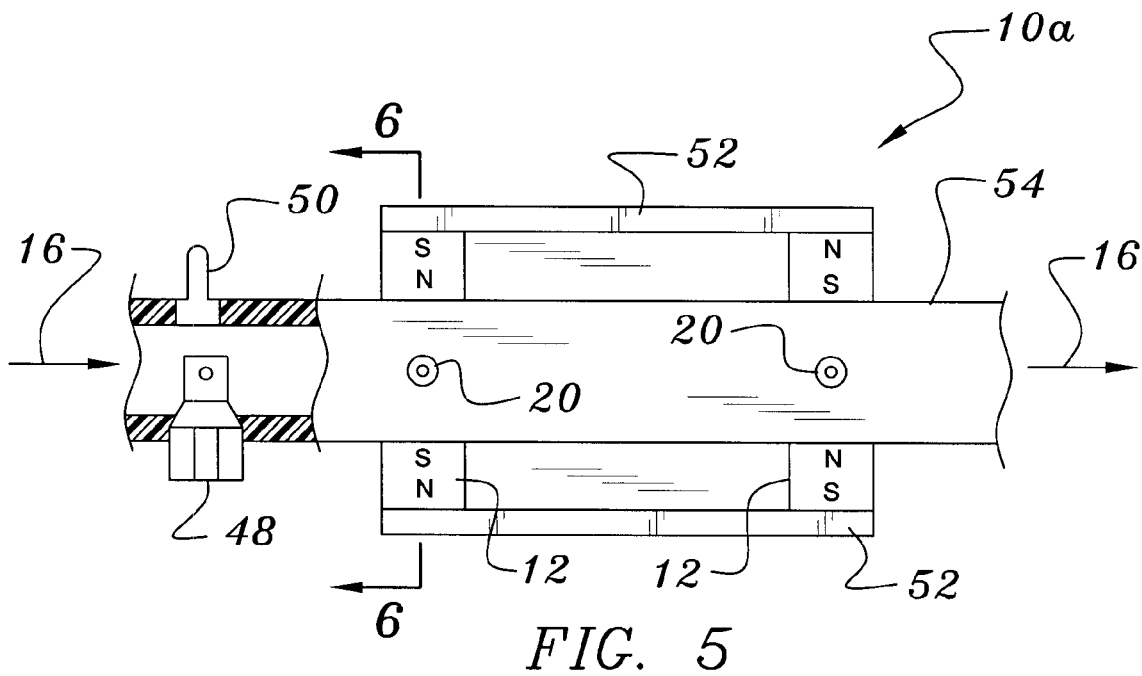
FIG. 5 is a partly cut-away schematic side elevational view of another in-line flow sensing head arrangement of the invention.
Figures 6A, 6B, 6C:
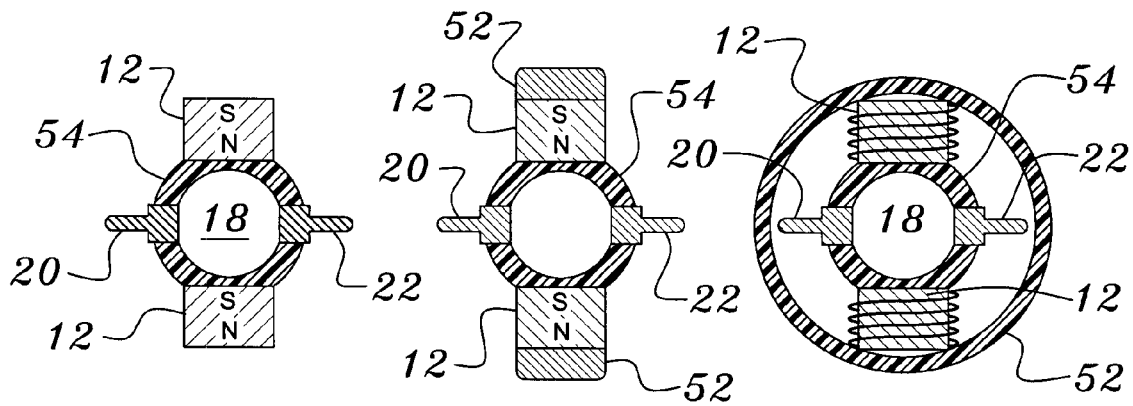
FIG. 6a is a cross-sectional view of a sensing head similar to that of FIG. 5, but from which the bridging bar is omitted, the section taken as indicated by the double-headed arrow 6—6 in FIG. 5.
FIG. 6b is a cross-sectional view of the sensing head of FIG. 5, the section taken as indicated by the double-headed arrow 6—6 in FIG. 5.
FIG. 6c is a cross-sectional view of a sensing head similar to those of FIGS. 6a and 6b, except that the magnets are depicted as being electromagnets, and the bridging bars of FIG. 5 are replaced with a bridging tube surrounding the flow sensing bead.

A representative flow sensor having a single sensing head and generally configured like that of FIGS. 5 and 6a was constructed using a Type 360 brass body into which a polysulfone insulating liner having a one half inch bore was inserted and sealed with O-rings. The brass body was slotted to receive two Nd rare earth magnets and had holes drilled through it and aligned with corresponding holes in the liner to receive the sensing electrodes, which were electrically insulated from the body. Each of the magnets was one half inch in diameter, one half inch long, and had a maximum energy product rating of twenty seven Megagauss-Oersteds. The two sensing electrodes were one quarter inch in diameter and made of the same alloy as the body. The end of the brass body, which contacted the fluid 18, was used as the ground electrode 50. This sensing head was used in conjunction with an electronic circuit made in accordance with the depiction of FIG. 2. A general purpose CMOS switch 30 was used to short the electrodes 20, 22 together. A CMOS differential amplifier having a high input impedance and enabling an overall voltage gain of one thousand to be achieved in the circuit was used to amplify the electrode voltages. A timing generator 31 supplied pulses with a duration of one millisecond to the CMOS switch at approximately ten times per second. The sample and hold circuit 38 was enabled two hundred microseconds after the CMOS switch opened to allow the amplified voltage to stabilize before sampling the signal. Sampling continued for the balance of the CMOS switch open time. An output from this circuit was approximately 0.125 volts for each gallon per minute of flow when tap water was passed through the sensing head.

When physical dimensions are small, the permanent magnets used in the depiction of FIGS. 5, 6a and 6b are relatively inexpensive and can conveniently and economically be used to provide a medium to high intensity magnetic field throughout the entire passage used for flow sensing. When only two electrodes and two magnets are used in the depicted sensor, sufficient flow related signal relative to electrode drift signal is present to enable practical sensors to be made this way. The overall sensing region may be elongated so that multiple sensing heads can be located along its length, as discussed above with respect to signal addition and to the detection of ferromagnetic debris. If a sensing head 10a is configured with two sets of magnets which are alternated in polarity with pieces of ferromagnetic material 52 joining them from pole to pole on the outside of the flow passage, the magnetic fields will be mostly confined to the sensing head.

In FIG. 5, the ground reference electrode 50 could also be located between each pair of sensing electrodes 20, 22 rather than off to the left side as shown. Electrode 50 would then tend to provide some electrical isolation between the left and right sensing heads. The effectiveness of this isolation is increased if electrode 50 is made relatively large and also in the shape of an annular ring One or more such rings for isolation between the sensor heads and also on either side of the sensor heads may be beneficially used. Electrodes 50 may also be electrically energized to at least partially cancel the shunting effect of the fluid 18 which occurs with a series connection between 2 or more closely coupled sensing heads. For example, the signal from the right sensing head is series added to that of the left sensing head so that electrode 20 from the left head is connected to electrode 20 from the right head, while electrode 22 from the left head and electrode 22 from the right provide the output signals.

Figures 7, 8B:
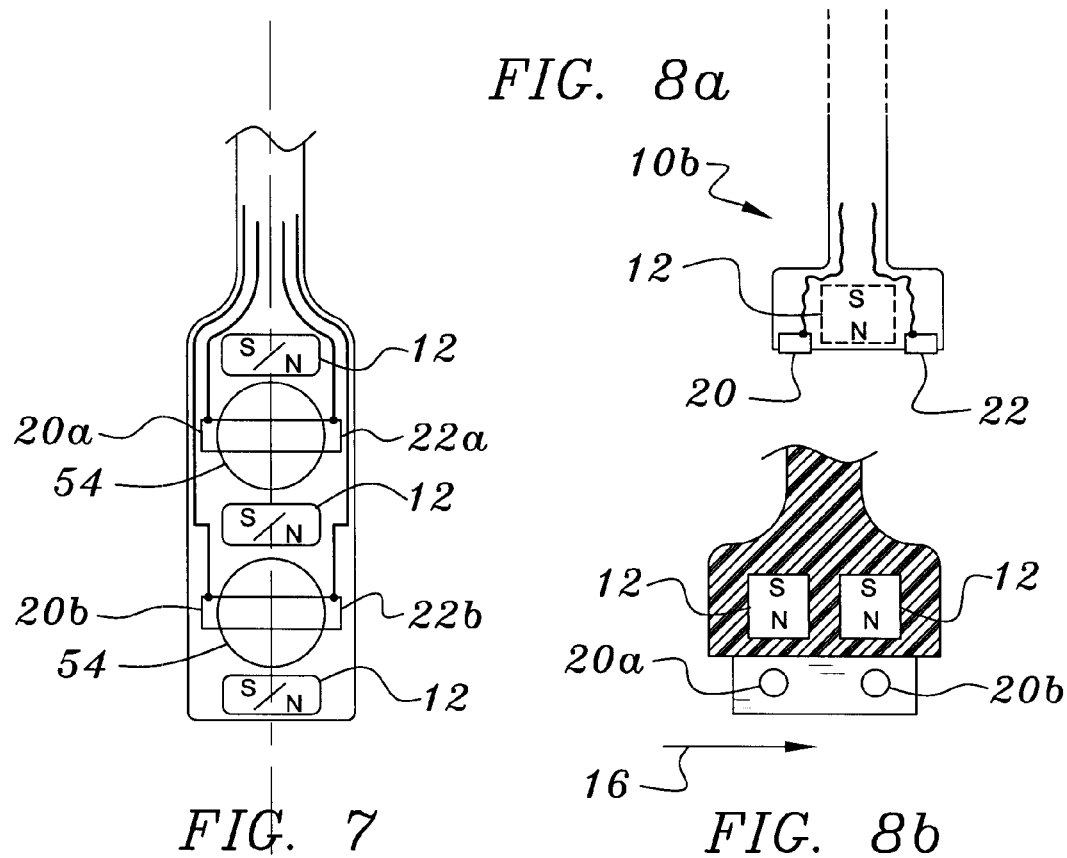
FIG. 7 is a schematic end view of a flow probe in which three permanent magnets supply magnetic flux to two flow channels.
FIG. 8b is a longitudinal section taken though a flow probe similar to that of FIG. 8a, but comprising two magnets and two pairs of electrodes.

Other sensing heads can be mechanically configured in a parallel array to accommodate a greater flow volume. For example, the flow probe depicted in FIG. 7 provides two flow passages 54, two pairs of electrodes 20a, 22a, 20b, 22b and three magnets 12, one of which is shared between the two flow passages. An arrangement of this sort reduces the total number of magnets used. As an additional refinement, a magnetic material in the shape of a tube may surround the sensing head, at least in the vicinity of the magnets, in order to complete the magnetic path between the magnets outside of the flow passage.

Figure 8C:
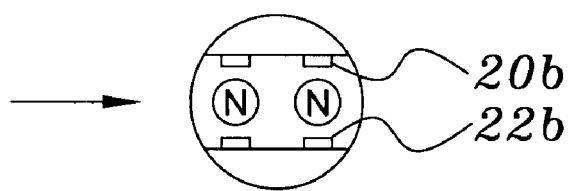
FIG. 8c is an end view of the flow probe of FIG. 8b.

FIG. 8a depicts a sensing head configured as a flow probe 10b in which a single magnet 12 provides the required magnetic flux. As in other sensing heads described above, a pair of electrodes 20, 22, sense the voltage signals in a fluid 18 flowing in a direction perpendicular to the plane depicted in FIG. 8a. FIGS. 8b and 8c depict a sensing head configured as a flow probe comprising two closely spaced magnets having the same polarity, where each of the magnets has a pair of electrodes adjacent it. The choice of the magnets' polarity in this probe is such as to minimize the risk of the magnets being bridged by ferromagnetic debris. When space permits, the magnets may be sufficiently removed from each other so that they can be oriented with opposite polarities without bridging. An advantage of opposite polarities is a shorter and more confined magnetic field outside of the region used for generating the flow rate responsive signal.

Figure 9:
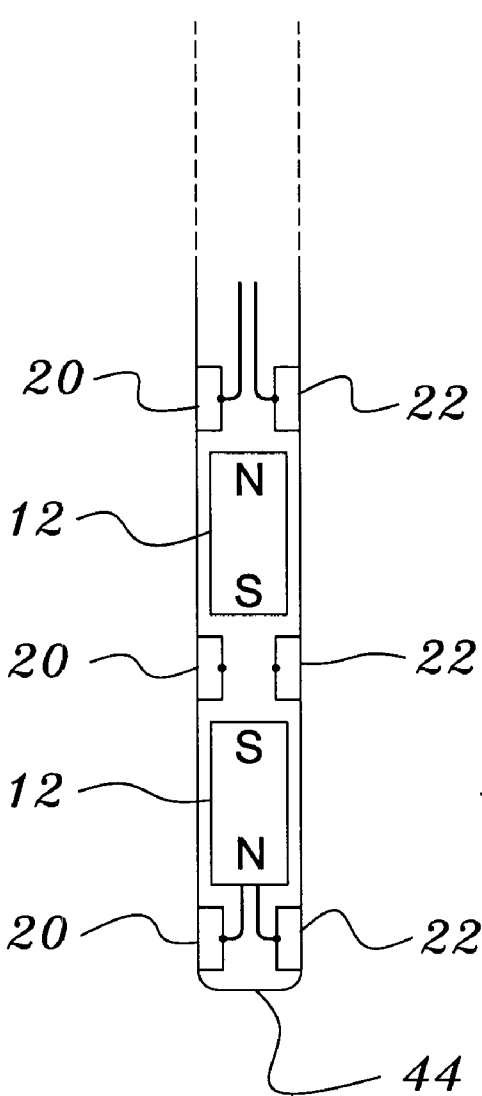
FIG. 9 is a schematic side view of a flow probe in which two permanent magnets are used with three pairs of electrodes.

Turning now to FIG. 9, one finds a depiction of another sensing head arranged as a flow probe to operate with fluid flowing perpendicular to the plane of the drawing. In this configuration the magnets 12 generate a magnetic flux orthogonal to the flowing fluid passing on either side of the support 44. By adding magnet and electrode pairs, the magnitude of the flow related signal may be further increased and averaging of the electrode signals further improved.

FIGS. 10a through 15 depict sensing head arrangements which channel the fluid 18 through various arrays of flow sensing heads to facilitate the direct summing of the flow related signals. In all of these figures the magnets are shown dotted in the side view sections to show their orientation with respect to the flow passages, as shown in the end view sections.

Figure 10A:
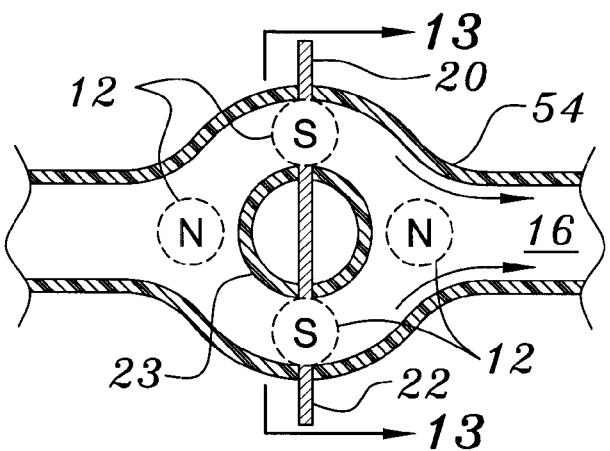
FIG. 10a is a schematic cross-sectional view of a sensor arranged to sum the flow generated signal from two sensing heads.
Figure 13:
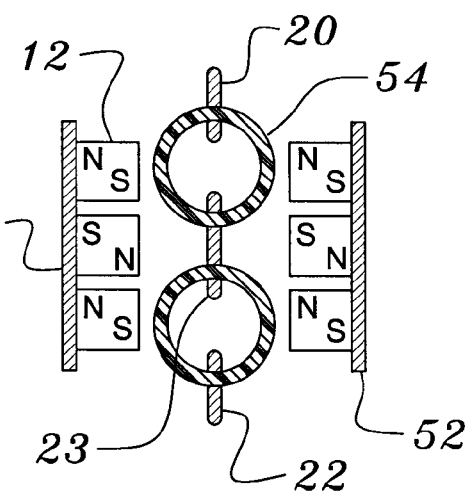

In FIG. 10a a fluid flow 18 splits into 2 paths 16 as defined by housing 54, to pass between pairs of magnets 12 on a vertical axis as illustrated in the cross sectional view of FIG. 13. A flow generated voltage is thereby generated on the upper and lower surfaces of each passage which is sensed by electrodes 20 and 22. The electrical connection between the passages is provided by electrode 23 which may be of a material like that of electrodes 20 and 22, or simply a conductive path provided by the fluid 18. It will be noted that the electrode 23 in FIG. 10a could be grounded to yield a balanced measurement. The magnets on the horizontal axis are provided to complete the magnetic circuit and may also function as magnetic traps. Ferromagnetic material 52, typically in the disc shape, completes the magnetic circuit on each side of the sensor. Since the flow 16 through the sensor passages is in the same direction and experiences the same polarity of magnetic flux, the flow generated voltages are additive. The drift voltages, when similar electrode materials are used, are of a random nature and will tend to average out to zero.

Figure 10B:
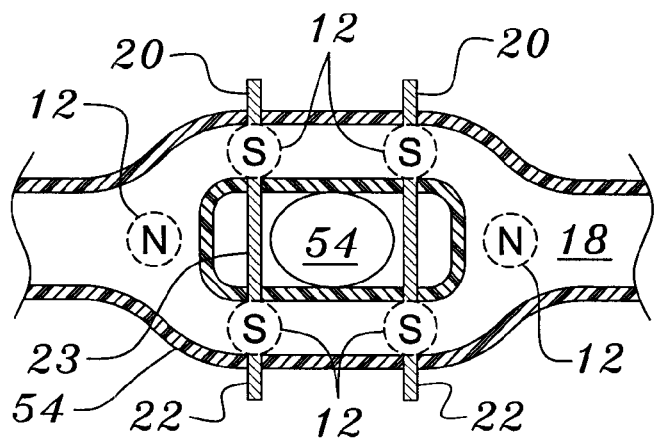

FIG. 10b is basically a multi-head representation of FIG. 10a. Output from the 2 pairs of electrode 20,22, 23 signals would be electronically combined as indicated earlier and the common magnetic flux path between the heads may be conveniently conveyed through ferromagnetic material 52, rather than a permanent magnet since it would not have a magnetic trapping function.

Figure 11:
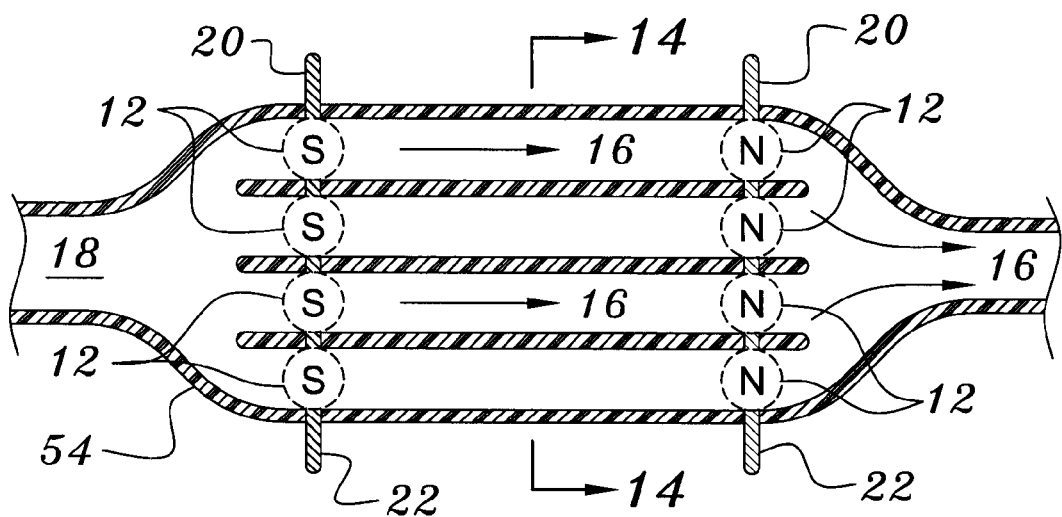
FIG. 11 is a schematic cross-sectional view of a sensing head arrangement using two arrays, each having four sensing heads, wherein the composite sensor arrangement sums the flow generated signals from each array.

FIGS. 11 and 14 depict another multi-head arrangement. The sensor housing 54 splits the fluid 18 into 4 paths 16, each having path 2 sensing heads which conveniently allow the magnetic circuit as illustrated in FIG. 14 to be completed. Electrodes 23 connect each vertical array of 4 sensing heads together so that the sum of all of each array appears at electrodes 20 and 22. The outputs from both arrays are electrically combined by the electronic processing circuits as indicated earlier.

FIGS. 12 and 15 depict an arrangement where the fluid 18 flow direction 16 is alternated by flow passages through housing 54 while the polarity orientation of magnets 16 is also alternated. Electrodes 23 series connect the outputs from all the sensing heads so that the net voltage at the electrodes 20 and 22 sense the sum of the flow generated voltage produced by each pair of magnets 12. Since the magnets 12 alternate in polarity, a magnetic flux path between them is easily provided by ferromagnetic material 52 as shown in FIG. 15. The full flow is used to produce a signal at each generating location so that a relatively high signal output is possible. The increased pressure drop experienced by the fluid because of its serpentine routing is tolerable in many applications.

FIG. 16 depicts yet another arrangement using a flow loop in which fluid sequentially flows by each of a plurality of heads. In this embodiment, all the heads are exposed to the same magnetic flux orientation so that the flow-generated signals are additive. It may be noted that although only a single magnetic subassembly comprising four permanent magnets and a ferromagnetic disk is shown, a preferred version of this sensing arrangement has a second magnetic subassembly on the side of the loop from which the view of FIG. 16 is taken. It will also be noted that a second measurement stage, similar to that shown in FIG. 16, could be used and arranged so that the exit port of the sensing array was co-axial with the inlet port.

Figure 17:
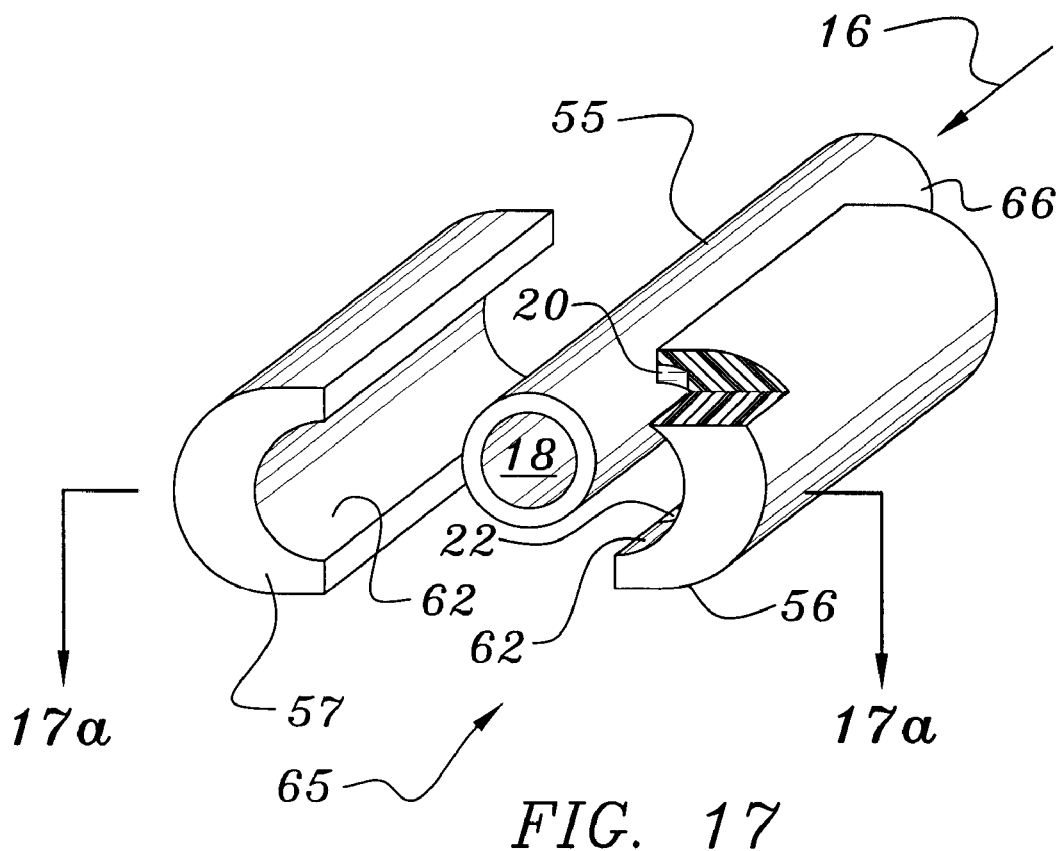
FIG. 17 is a partly cut-away exploded view of a sensing head assembly comprising a two-part electrically insulating housing that can be fitted about a fluid-carrying tube without first breaking or severing the tube.
Figure 17A:
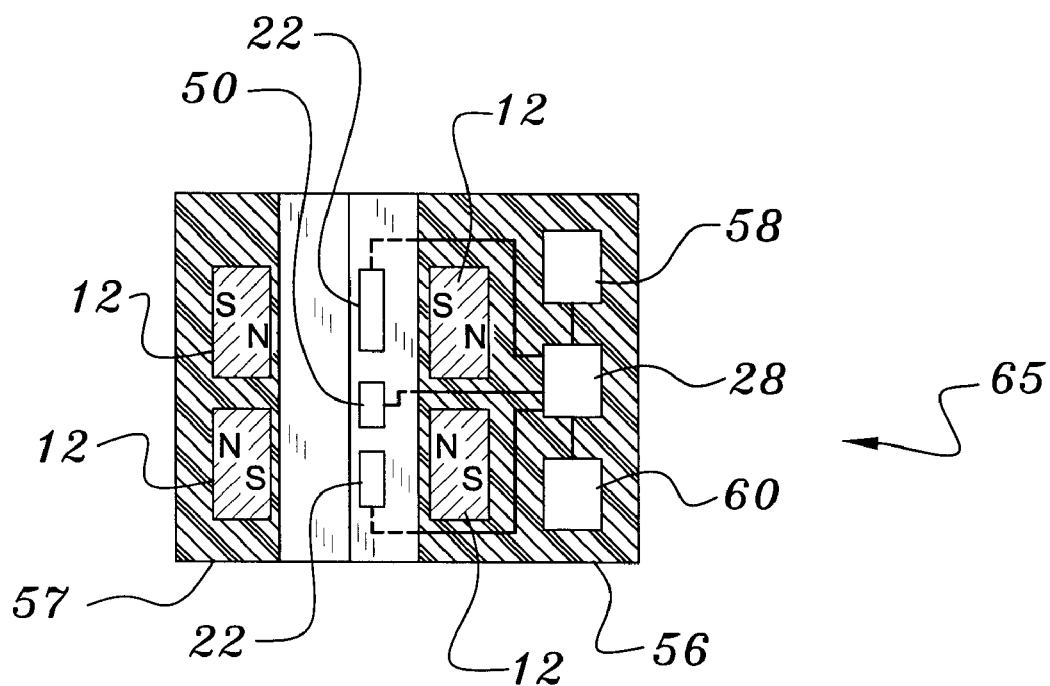
FIG. 17a is a partly schematic cross-sectional view of the sensing head of FIG. 17a, the section taken as indicated by the double-headed arrow 17a—17a in FIG. 17.

A surface-mount embodiment 65 of the invention depicted in FIGS. 17 and 17a is adapted to be used with a blood vessel or other flow tube 55 having weakly electrically conducting walls in which the electrical conductivity is high enough to allow electrodes connecting an outer surface 66 of the tube 55 to measure the flow-related voltage, but low enough, compared to the conductivity of the fluid 18, so that the shunting effect on the flow generated signals is tolerable. The embodiment depicted in FIGS. 17 and 17a preferably uses an electrically insulating housing comprising two separate parts 56 and 57, each of the housing parts having an external concave surface 62 shaped so as to receive the tube 55. With this configuration, the tube 55 can be brought into operative contact with the sensing head by locating it between the housing portions 56, 57 without requiring that the flow tube 55 be severed. If the tube 55 is a blood vessel, it is also soft enough and conformable enough to enable a reliable contact to be made to the electrodes 20, 22 and 50 when the vessel is received in the housing. Because the magnets 12 depicted in FIG. 17a are mutually attractive, the two housing parts 56, 57 squeeze against each other, facilitating a good electrical contact with the electrodes 20, 22, 50 as long as a snug or tight fit is provided. As discussed previously with respect to other embodiments of the invention (e.g., FIG. 5), the surface mount sensor 65 can employ pieces of ferromagnetic material to complete various magnetic circuits. In the interest of clarity of presentation, no ferromagnetic material is shown in the depictions of FIGS. 17 and 17a.

In a preferred embodiment of the surface-mount sensor 65, one of the two housing parts 57 is essentially a cap member that may contain one or more cap magnets and cap ferromagnetic material, but that does not contain electrodes or any of the related circuitry. The major housing member 56 preferably contains the sensing 20, 22 and ground 50 electrodes; the requisite flow processing circuitry 28; a power supply 58, which may comprise a battery or an inductive loop; and a communication circuit 60, which may comprise RF, optical, acoustic, or other communication arrangements known in the art, and which may also incorporate memory allowing it to function as a data store and forward unit of the type known in the datalogging arts. In this arrangement the surface-mount sensor can be implanted in a living body for blood flow measurements, or used in a surgical setting where it is desirable to have a blood flow sensor that does not encumber the surgical field with a profusion of wires. Although the cap portion 57 of the housing basically functions to provide a stronger, better defined magnetic field by the sensing electrodes, it may be noted that a sensor of this sort, having all the active components located in one part of the housing, may be operated without using the cap 57.

It may also be noted that a surface mount sensor configuration can be made in which the electrodes 20, 22 and 50 protrude somewhat from the housing 56 to make a better contact with tube 55. In non-biological applications, an insulating tube may be used with a surface mount sensor having electrodes configured to pierce its wall, or may have ports cut into a wall of the insulating tube so as to allow contact to electrodes disposed on the housing 56.

Figure 5A:
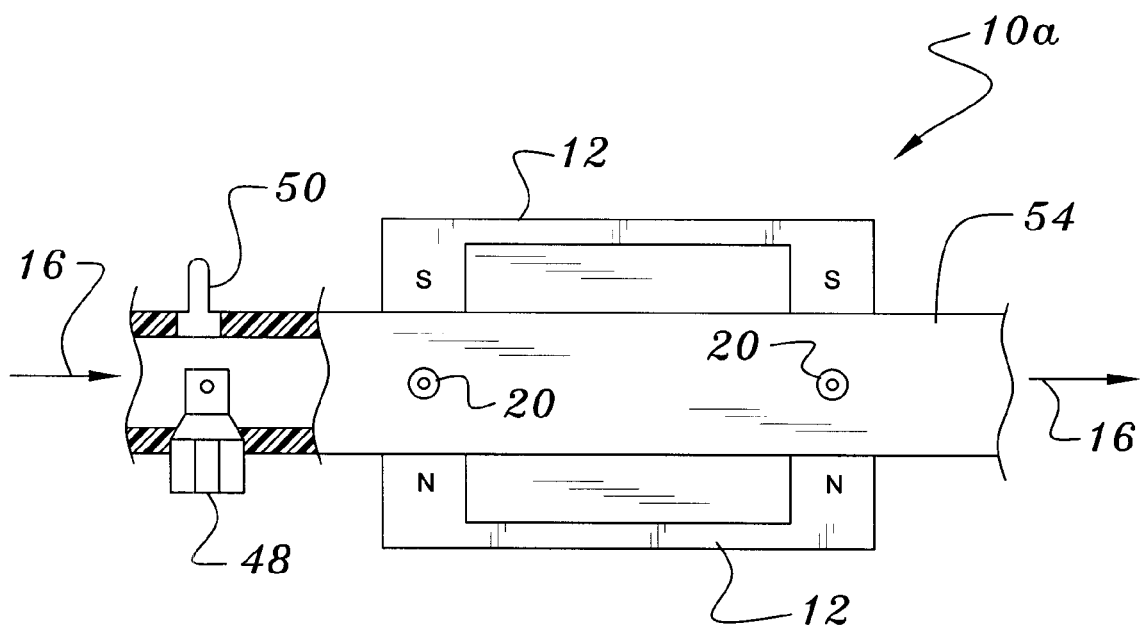
FIG. 5a is variation on the sensing head arrangement of FIG. 5 in which the number of magnets is reduced.

In all of the embodiments previously described a stable magnetic field needs to be present so as to penetrate the fluid during the interval when the sensing electrodes are connected to the voltage measurement circuit to detect the flow generated voltage difference. The field need not be present at other times. Thus, although most of the foregoing discussion has addressed the use of permanent magnets, one could as well choose to use electromagnets in configuring the various exemplar sensing heads. The sensing arrangements depicted in FIGS. 5, 5a, 6a, 6b and 6c, for example, are particularly amenable to the use of electromagnets (as specifically depicted in FIG. 6c) instead of permanent magnets. For example, if the magnets 12 in FIG. 5a were electromagnets wound to have the depicted alternating polarity, that dual sensing head arrangement would provide a highly efficient magnetic circuit. This arrangement would have, relative to prior art electromagnetic flow meters, a high signal to drift voltage output, an advantage that would accrue even to flow metering arrangements that did not use the disclosed switching arrangements that connect the electrodes to a voltage measurement circuit only during a very brief portion of an operating cycle. Moreover, when an electromagnet is used, the polarity of the magnetic field may be periodically reversed, in which case the processing electronics would additionally incorporate an appropriate rectifying function. Such fields and electronic processing are commonly used with conventional magnetic flow meters. By using the features of the present invention to reduce electrode drift, these sensors become more stable and tolerant of their installation environment.

A particular deficiency of prior art permanent magnet flow meters is that by not reversing the magnetic field or at least cyclically diminishing it to zero, ferromagnetic debris in the fluid will be attracted to and accumulate on the sensor surfaces opposite the pole faces of the magnets 12. Such accumulations will affect the fluid flow through the sensor, distort its signal generating magnetic field and shunt the flow generated signal thereby degrading its precision of measurement in varying degrees depending on the extent of the accumulations. In applications where ferromagnetic debris is present in the fluid, the sensing head may have to be removed from service and cleaned periodically.

Another approach to minimizing problems with ferromagnetic debris is to install a magnetic trap 48 on at least the upstream side of a sensing head. This trap 48 need only consist of a permanent magnet providing a magnetic flux which effectively acts as a filter to attract and retain ferromagnetic debris before it reaches the sensing head. The trap 48 may be mounted in a pipe or tube in direct contact with the fluid and may be in the form of a plug which is removable for cleaning. The trap may further be inserted and removed when isolated though a valve without the need to stop normal fluid flow. Furthermore, a sensing head based upon the present invention may be configured as a probe that can be easily inserted and removed from its flow environment to facilitate frequent cleaning.

Because the mechanical, magnetic and electrical components of a preferred sensor are relatively simple and inexpensive, it is practical to have the same fluid flow pass through what is essentially a second sensing head which may also be mechanically supported by the same housing. While the flow generated signals may be combined for the purposes of making a flow rate measurement, they may also be compared to determine whether they differ substantially. If they do so differ, it would likely be an indication of accumulation of magnetic debris. It is noted that the flow responsive components on the inlet, upstream, side of the sensor would then have functioned as a magnetic trap and attracted virtually all of the debris, while those on the downstream end would be clean. When the corresponding difference in output signals is great enough, it can be used to activate an alarm calling for sensor servicing. Furthermore, when an upstream sensing head provides a flow rate signal determined to be substantially in error because of debris, that signal may be automatically omitted so that only the output signal produced by the downstream flow responsive components, with a correct scaling factor, is used to provide the output signal until the sensor is serviced. The difference detection and compensation arrangement expressed above is also useful for detecting any defect in operation in general and thereby for improving the overall reliability of the sensor.

Accumulations of magnetic debris are particularly troublesome when they are electrically conductive because they can then substantially short circuit the flow generated signal. However, the short circuit can be detected by periodic measurement of the electrical resistance between the electrodes. If the resistance should fall below a predetermined alarm threshold, an alarm function can then be initiated to advise service personnel of the need to clean the sensing head. The resistance measurement is preferably made by occasionally switching a voltage difference of 0.1 volts, for example, across an electrode pair and ground during a period when the switching device 30 is connecting the electrodes to the measurement circuit and the sample and hold is disabled. The electrical resistance is equal to the value of a series resistor multiplied by the ratio of the difference voltage between the electrodes and the resistor. This technique may further be used to compare resistance values between different sensing heads when making the comparisons recited above in deciding whether to activate an alarm or to eliminate invalid signals.

Another alternate or additional approach to protecting a sensing head from ferromagnetic debris is to periodically remove the sensor's magnetic field by physically removing the permanent magnets or turning off electromagnets. This will release the debris which can then be removed by fluid flow or captured by a trap. The sensing heads depicted in FIGS. 5, 5a, 6a and 6b are examples of configurations compatible with removal of the permanent magnets, which can slide horizontally out of position and then be replaced. Ideally, the magnets would be configured as one or more modules to facilitate such removal and replacement.

Those skilled in the art can now appreciate from the foregoing description that the broad teachings of the present invention can be implemented in a variety of forms. For example, the present sensing method is applicable to revenue collecting water meters, robotic flow sensing as in paint sprayers, agricultural water and chemical flow sensors and industrial, chemical and pharmaceutical flow sensors. A further application includes biological, medical or animal raising activities because the inherently small size, low power requirements and absence of moving parts of the related sensors. Such sensors may be readily implanted, and in some applications, when the highest precision is not required, may be used with electrodes and ground connections that do not penetrate the walls of flow passages (e.g., blood vessels), but only contact the outside walls of these vessels. These walls, being weakly electrically conductive, enable such flow sensors to function. Therefore, while this invention has been described in connection with particular examples thereof, the true scope of the invention should not be so limited since other modifications will become apparent to the skilled practitioner upon a study of the drawings, specification and following claims.

Figure 18:
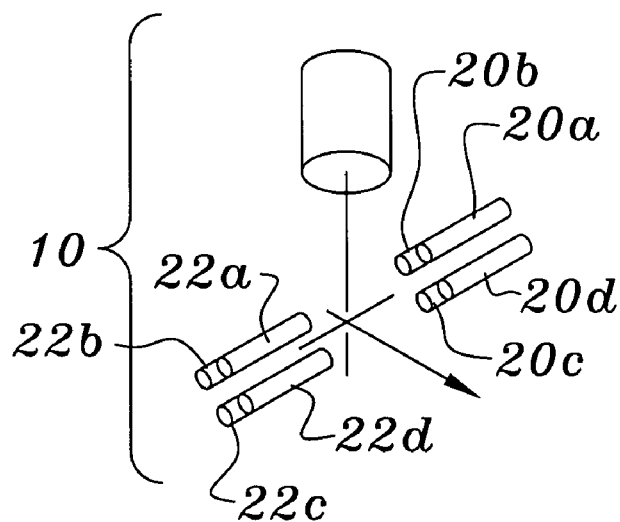
FIG. 18 is a schematic view of sensing head portion of a flow sensor of the invention having arrays of electrodes.

Turning now to FIG. 18, one finds a schematic depiction of a sensing head 10 having paired arrays of electrodes (20a, 20b. 20c, 20d; 22a, 22b, 22c, 22d) instead of the paired single electrodes 20, 22 depicted in FIG. 1. This arrangement permits of a combinatorial approach to averaging out drift voltages. In this approach each electrode of one of the two arrays is sequentially paired with each of the electrodes in the other array, a voltage measurement is made for each pairing, and the resultant array of voltage values are averaged. In the depicted example, in which each array comprises four electrodes, one could measure sixteen possible combinations of such voltages.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A flow sensor for measuring a flow rate component, along a selected direction, of a fluid flowing in a flow direction relative to a sensing head, the sensor comprising:
   at least one stationary magnet arranged to have its magnetic axis generally orthogonal to the flow direction and to the selected direction;
   at least one pair of electrodes wetted by the fluid when it is present, the electrodes of the at least one pair thereof spaced apart from one another along a line generally orthogonal to both the selected direction and to the magnetic axis;
   at least one switching device having at least two states, the switching device, when in the first state, directly electrically connecting each electrode to a respective reference voltage; the switching device, when in a second state, connecting a voltage measurement circuit between an electrode of the at least one pair thereof and that other electrode with which it is paired;
   wherein the voltage measurement circuit is adapted to measure a voltage between the electrodes of the at least one pair thereof and to provide therefrom an output representative of the flow rate component.

2. The flow sensor of claim 1 wherein the reference voltage for each of the electrodes is an electric ground.

3. The flow sensor of claim 1 further comprising means to vary at least one respective reference voltage responsive to a flow output.

4. The flow sensor of claim 1 wherein the at least one switching device has a third state wherein it connects an AC signal source between the two electrodes of the at least one pair thereof.

5. The flow sensor of claim 1 wherein the at least one pair of electrodes comprises one pair of arrays of electrodes spaced apart from each other, and wherein the switching device is adapted to sequentially connect the voltage measurement circuit between a selected electrode and each of the other electrodes from which it is spaced apart.

6. The flow sensor of claim 1 further comprising a timing generator adapted to control the at least one switching device to repeatedly switch between the first and the second states so that the switching device is in the first state most of the time.

7. The flow sensor of claim 1 wherein the at least one magnet comprises at least one pair of magnets respectively associated with each pair of electrodes.

8. The flow sensor of claim 1 comprising at least two pairs of electrodes spaced apart along the flow direction and aligned with respect to the at least one magnet so that a magnetic field from the at least one magnet is in the same direction adjacent each of the pairs of electrodes and wherein one of the electrodes of each pair thereof is connected to a respective electrode of another pair thereof whereby the voltage measurement circuit is adapted to measure a sum of the voltages associated with the respective electrode pairs.

9. The flow sensor of claim 1 comprising two pairs of electrodes spaced apart from each other along the flow direction and aligned with respect to the at least one magnet so that a magnetic field from the at least one magnet is in a first direction adjacent a first of the electrode pairs and in the opposite direction adjacent the second of the electrode pairs, and wherein the voltage measurement circuit is adapted to separately measure the voltage between each of the two pairs of electrodes and to provide the output representative of the flow rate responsive to a sum of the measured voltages.

10. A flow sensor for measuring a flow rate at which a fluid flows, the sensor comprising:
    at least one stationary magnet arranged to have a magnetic axis generally orthogonal to a direction in which the fluid flows adjacent the at least one magnet;
    at least two pairs of electrodes wetted by the fluid when it is present, the two electrodes of each of the at least two pairs spaced apart from one another along a respective line generally orthogonal to both the direction in which the fluid flows between them and to the magnetic axis; the two pairs of electrodes spaced apart from each other along the flow direction;
    at least one switching device for switching each of the at least two pairs of electrodes between a respective open circuit state in which a respective voltage between the electrodes of the respective pair thereof is representative of the fluid flow and a closed circuit state in which each of the electrodes of the respective pair thereof is directly electrically connected to one of a respective reference voltage and that electrode with which the each of the electrodes is paired; and
    a voltage measurement circuit connected by the at least one switching device to each of the pairs of electrodes when that pair of electrodes is in its respective open circuit state.

11. The flow sensor of claim 10 wherein, in the respective closed state, each of the electrodes is shorted to that other electrode with which it is paired.

12. The flow sensor of claim 10 wherein, in the respective closed state, each of the electrodes is connected to a respective reference potential.

13. The flow sensor of claim 10 wherein the at least one magnet comprises at least one pair of permanent magnets respectively associated with each pair of electrodes.

14. The flow sensor of claim 10 wherein the at least two pairs of electrodes are aligned with respect to the at least one magnet so that a magnetic field from the at least one magnet is in the same direction adjacent each of the pairs of electrodes, and wherein one electrode of the first pair thereof is connected to a respective electrode of the second pair thereof so that the voltage measurement circuit is adapted to measure a sum of the voltages associated with the respective electrode pairs.

15. The flow sensor of claim 10 comprising two pairs of electrodes aligned with respect to the at least one magnet so that a magnetic field from the at least one magnet is oppositely directed adjacent respective electrode pairs, and wherein the voltage measurement circuit is adapted to separately measure the voltage between each of the respective pairs of electrodes and to provide the output representative of the flow rate responsive to a sum of the measured voltages.

16. The flow sensor of claim 10 wherein the switching device is adapted to switch all of the electrode pairs into the respective open circuit state simultaneously.

17. The flow sensor of claim 10 wherein the switching device is adapted to switch each of the respective electrode pairs into the respective open circuit state sequentially.

18. A method of operating a magnetic flow sensor in which a fluid flows in a flow direction orthogonal to a magnetic field, the flow sensor comprising at least one pair of electrodes spaced apart from each other along a selected direction orthogonal to the magnetic field, the flow sensor further comprising at least one voltage measurement circuit for measuring an electric voltage between the at least one pair of electrodes, the electric voltage proportional to a component of the flow rate that is orthogonal to both the selected direction and to the magnetic field, the method comprising the steps of:

operating at least one electric switching device to switch, for a first selected interval, each of the at least one pair of electrodes into a closed circuit state in which the each of the electrodes is directly electrically connected to one of a respective reference voltage and that electrode with which the each of the electrodes is paired;

operating the at least one electric switching device to connect, for a second selected interval each of the at least one pair of electrodes to a voltage measurement circuit; and measuring the electric voltage during the second selected interval.

19. The method of claim 18 further comprising a step of operating the at least one electric switching device to connect, for a third selected interval, an AC signal source between each of the at least one pair of electrodes.

20. The method of claim 18 wherein the at least one pair of electrodes comprises a pair of arrays of electrodes and wherein during the second interval the switching device sequentially connects an electrode of a first array thereof to each of the electrodes of the second array thereof.

21. The method of claim 18 wherein the selected direction is orthogonal to the flow direction, and wherein the flow sensor comprises at least two pairs of electrodes spaced apart along the flow direction, and wherein one electrode of the first pair thereof is connected to a respective electrode of the second pair thereof so that the step of measuring the electric voltage comprises measuring a sum of voltages between each of the pairs of electrodes.

22. The method of claim 18 wherein the selected direction is orthogonal to the flow direction, and wherein the flow sensor comprises two pairs of electrodes spaced apart from each other along the flow direction, and wherein the step of measuring the respective voltage during the respective second interval is followed by a step of adding the measured voltages from the two pairs of electrodes.

23. A flow sensor for measuring a flow rate at which a fluid flows through a tube having a weakly electrically conductive wall, the sensor comprising:

a housing having an external concave surface shaped so as to receive the tube;

at least one permanent magnet fixedly disposed in the housing so that its magnetic axis is generally orthogonal to a direction of flow through the tube when the tube is received in the housing;

at least one pair of electrodes spaced apart on the external concave surface of the housing so as to contact an external surface of the tube when the tube is received in the housing and so that a line between the two electrodes making up the at least one pair thereof is generally orthogonal to both the direction of flow in the tube and the magnetic axis;

at least one switching device disposed in the housing, the switching device for switching each of the pairs of electrodes between a respective open circuit state in which a voltage between the electrodes of the respective pair thereof is representative of the fluid flow and a closed circuit state in which each of the electrodes is directly electrically connected to one of a respective reference voltage and that electrode with which the each of the electrodes is paired; and a voltage measurement circuit disposed in the housing, the voltage measurement circuit for measuring the respective voltage representative of the flow rate.

24. The flow sensor of claim 23 further comprising a power supply disposed in the housing, the power supply connected so as to provide electric power to the switching device and the measurement circuit.

25. The flow sensor of claim 23 further comprising a communication circuit disposed in the housing, the communication circuit adapted to receive an output from the measurement circuit.

26. The flow sensor of claim 23 comprising at least two pairs of electrodes spaced out along the tube.

27. The flow sensor of claim 23 wherein the housing comprises a major member and a cap member, the cap member having at least one cap permanent magnet disposed therein, the cap permanent magnet arranged so that the cap and the major member are magnetically attracted so as to capture the tube between them.

28. Apparatus for measuring a flow rate of a fluid in a tube, the apparatus comprising:

at least two pairs of electrodes spaced apart a selected distance along the tube, each of the electrodes wetted by the fluid when the fluid is in the tube, each of the electrodes spaced apart from that other electrode with which it is paired along a line generally orthogonal to the tube;

at least two stationary magnets spaced apart by the selected distance along the tube so that at least one magnet is respectively adjacent each pair of electrodes, each of the at least two magnets for providing a respective magnetic field orthogonal both to the tube and to the respective line along which the two electrodes of the adjacent pair thereof are spaced;

a piece of ferromagnetic material extending the selected distance along the tube so as to extend between two of the at least two magnets; and at least one voltage measurement circuit for measuring a voltage difference between each of the electrodes and that other electrode with which it is paired.

29. The apparatus of claim 28 wherein each of the at least two magnets is a respective permanent magnet and wherein the at least two permanent magnets are arranged so that the magnetic field from a first of the at least two magnets has a polarity opposite to that of the magnetic field from a second of the at least two magnets.

30. The apparatus of claim 28 wherein each of the at least two magnets is a respective electromagnet and wherein the at least two electromagnets are wound so that the polarity of the magnetic field from a first of the at least two magnets is opposite to that of the magnetic field from a second of the at least two magnets.

31. The apparatus of claim 28 further comprising a switching device adapted to switch each of the at least two pairs of electrodes between a respective open circuit state in which a voltage between the electrodes of the respective pair thereof is representative of the fluid flow and a closed circuit state in which each of the electrodes is connected to one of a respective reference voltage and that electrode with which the each of the electrodes is paired.

* * * * *